United States Patent [19]
Bronicki et al.

[11] Patent Number: 5,687,570
[45] Date of Patent: Nov. 18, 1997

[54] EXTERNALLY FIRED COMBINED CYCLE GAS TURBINE SYSTEM

[75] Inventors: Lucien Y. Bronicki, Yavne; Daniel Goldman, Raanana; Joseph Sinia, Ramat Gan, all of Israel

[73] Assignee: Ormat Industries Ltd., Yavne, Israel

[21] Appl. No.: 594,476

[22] Filed: Jan. 31, 1996

Related U.S. Application Data

[63] Continuation of Ser. No. 202,476, Feb. 28, 1994, abandoned.

[51] Int. Cl.$^6$ ..................................................... F01K 23/10
[52] U.S. Cl. ............................... 60/655; 60/670; 60/682; 60/673
[58] Field of Search .............................. 60/655, 670, 682, 60/683

[56] References Cited

U.S. PATENT DOCUMENTS

| | | | |
|---|---|---|---|
| 3,446,012 | 5/1969 | Foster-Pegg | 60/39.02 |
| 3,715,887 | 2/1973 | Weatherly et al. | 60/682 |
| 4,211,606 | 7/1980 | Ponomarev et al. | 201/12 |
| 4,326,382 | 4/1982 | Baardson | 60/655 |
| 4,380,154 | 4/1983 | Eastman | 60/682 |
| 4,414,813 | 11/1983 | Knapp | 60/655 |
| 4,479,355 | 10/1984 | Guide et al. | 60/655 |
| 4,503,681 | 3/1985 | Willyoung et al. | 60/655 |
| 4,542,625 | 9/1985 | Bronicki | 60/655 |
| 4,637,212 | 1/1987 | Aguet | 60/655 |
| 4,823,712 | 4/1989 | Wormer | 110/245 |
| 4,942,736 | 7/1990 | Bronicki | 60/655 |
| 5,165,239 | 11/1992 | Bechtel et al. | 60/683 |
| 5,241,825 | 9/1993 | Collin et al. | 60/655 |
| 5,327,726 | 7/1994 | Daman et al. | 60/655 |

OTHER PUBLICATIONS

Mordell, D.L., "The Exhaust-Heated Gas-Turbine Cycle," ASME 49-F-6.

Foster-Pegg, R.W., and Davis, J.S., "A Coal Fired Air Turbine Cogeneration System," ASME 83-GT-181.

Foster-Pegg, R.W., "A 400 MW Combined Cycle Using Fluidized Combustion of Coal at Atmospheric Pressure," Inter Society Energy Conversion Energy Conference, Aug. 1984.

Smith, J., Strimbeck, D.C., Coates, N.H. and McGee, J.P., "Bureau of Mines Progress in Developing Open and Closed-Cycle Coal-Burning Gas Turbine Power Plant," Transactions of the ASME, *Journal of Engineering of Power*, Paper No. 66-GT/CLC-7.

Foster-Pegg, R.W., "A Small Air Turbine Power Plant Fired with Coal in an Atmospheric Fluid Bed," ASME 89-GT-216, Jun., 1989.

Huang, F.F. and Naumowicz, T., "A Methodology for the Selection of Design Parameters for Externally-Fired Air-Turbine Cogeneration Systems," IGTI-vol. 8, ASME Cogen-Turbo 1993, pp. 11-17.

(List continued on next page.)

*Primary Examiner*—Alfred Basichas
*Attorney, Agent, or Firm*—Donald M. Sandler

[57] ABSTRACT

An externally fired gas turbine system according to the present invention has a compressor for compressing ambient air and producing compressed air, an air heat exchanger for heating the compressed air to produce heated compressed air, a turbine for expanding the heated compressed air to produce heat depleted expanded air, and a generator connected to the turbine for generating electricity. According to the present invention, the system also includes combustible products producing apparatus for processing fuel to produce combustible products that include combustible gases and an external combustion chamber for burning the combustible products and transferring heat to the air heat exchanger and producing heat depleted combustion products. The system also includes a closed Rankine cycle steam power plant having a water heat exchanger for vaporizing water and producing steam using heat contained in the heat depleted combustion products. The power plant further includes a steam turbine for expanding the steam producing power and expanded steam, and a steam condenser for condensing the expanded steam producing condensate that is returned to the water heat exchanger.

35 Claims, 9 Drawing Sheets

OTHER PUBLICATIONS

Foster–Pegg, R.W., "A Method for Assessing and Comparing the Potential Efficiencies of Advanced Fossil Fuelled Combined Cycles," IGTI–vol. 8, ASME Cogen–Turbo 1993, pp. 409–415.

Legerer, F.J., "Indirectly Fired Gas Turbine Cycle, Suitable for Biomass Combustion," IGTI–vol. 8, ASME Cogen–Turbo 1993, pp. 511–515.

"EFCC Cashes in Under Clean Coal 5," *Modern Power Systems Journal*, Jul. 1993, Wilmington Publishing Ltd.

EXTERNALLY FIRED COMBINED CYCLE GAS TURBINE SYSTEM

This application is a continuation of application Ser. No. 08/202,476, filed Feb. 28, 1994, now abandoned.

FIELD OF THE INVENTION

This invention relates to externally fired combined cycle gas turbine systems which are sometimes referred to as EFGT Systems.

BACKGROUND OF THE INVENTION

Externally fired gas turbine/combined cycle systems have been described in the literature for a number of years. Such systems include a compressor for compressing ambient air, an indirect contact heat exchanger in which combustible products, e.g., gas and/or fuel vapors, hereinafter referred to as "combustible gases", are burned to heat the compressed air, and a turbine in which the heated compressed air is expanded driving a generator that produces electricity. Heat contained in the turbine exhaust is used to vaporize water that is converted into steam in a separate water-based, closed Rankine cycle power plant, the steam being expanded in a steam turbine in the power plant for driving a generator that produces additional electricity.

EFGT systems have been proposed for use with low calorific, unclean gaseous fuels as well as with hot gaseous fuels. Solid fuels are more difficult to incorporate into EFGT systems because of the problems associated with ash and noxious gases produced during the combustion process. It is therefore an object of the present invention to provide a new and improved externally energized gas turbine system such as an externally fired combined cycle gas turbine system which is capable of using solid fuels without many of the usual attendant problems associated with burning such fuel in a combined cycle gas turbine system.

BRIEF DESCRIPTION OF THE INVENTION

An externally energized gas turbine system such as an externally fired gas turbine system according to the present invention has a compressor for compressing ambient air and producing compressed air, an air heat exchanger for heating the compressed air to produce heated compressed air, a turbine for expanding the heated compressed air to produce expanded air, and a generator connected to the turbine for generating electricity. According to the present invention, the system also preferably includes what is termed "combustible products producing apparatus" for processing fuel to produce gas and/or fuel vapor collectively referred to hereinafter as "combustible gases", and an external combustion chamber for burning the combustible gases and transferring heat to the compressed air flowing through the air heat exchanger and producing heat depleted combustion products. The system also preferably includes a closed Rankine cycle steam power plant having a water heat exchanger for vaporizing water and producing steam using heat contained in the gaseous heat depleted combustion products. The power plant further includes a steam turbine for expanding the steam thereby producing power, and from which expanded steam exits, and a steam condenser for condensing the expanded steam producing condensate that is returned to the water heat exchanger.

In one embodiment of the invention, the water heat exchanger includes a preheater heated by the expanded air for heating the condensate and producing preheated water, and a vaporizer heated by the heat depleted combustion products for vaporizing the preheated water thereby producing steam for the turbine of the power plant.

In a preferred form of the invention, the combustible products producing apparatus includes a pyrolyzer for processing oil shale and producing combustible gases and a carbonaceous residue, and an air furnace for combusting the organic material remaining in the carbonaceous residue thereby producing hot flue gases and ash in the form of hot particulate. Means are provided for returning hot ash to the pyrolyzer. In this instance, the combustible gases produced by the pyrolyzer and the hot flue gases produced by the air furnace, together with solid particulate matter, constitute the combustible products produced by the processing of the oil shale by the combustible products producing apparatus.

In another embodiment of the invention, the water heat exchanger includes a superheater heated by the flue gases for superheating steam produced by the vaporizer. In another embodiment of the invention, the water heat exchanger includes a preheater heated by both the heat depleted combustion products and the expanded air (for heating the condensate thereby producing preheated water), and a vaporizer heated by the flue gases for vaporizing the preheated water.

In a further embodiment of the invention, the water heat exchanger includes a vaporizer heated by both the heat depleted combustion products and the expanded air for converting the condensate into steam. In such case, a second water-based, closed loop Rankine cycle power plant may be provided. The second power plant has a second water heat exchanger for vaporizing water and producing steam using heat contained in the flue gases produced by the gas producing apparatus, and a second steam turbine for expanding the steam and producing power and expanded steam. The second power plant also includes a second steam condenser for condensing the expanded steam exiting the steam turbine and producing condensate which is returned to the second water heat exchanger.

In a still further embodiment, heat depleted combustion products and expanded air heat an organic fluid in an organic fluid vaporizer producing organic vapor for operating an organic vapor turbine. In such case, the flue gases produced by the combustible products producing apparatus heat water in a water heat exchanger for vaporizing the water and producing steam for operating a steam turbine.

The organic vapor is supplied to the organic vapor turbine for producing power. Expanded organic vapor exits from the organic vapor turbine and is supplied to a condenser for producing organic fluid condensate. Steam produced in the water heat exchanger is supplied to the steam turbine for producing power. Expanded steam exhausted from the steam turbine is supplied to a steam condenser for producing steam condensate. In this embodiment, the expanded steam supplied to the steam condenser is cooled by organic fluid condensate and the resultant steam condensate is supplied to the water heat exchanger. Organic fluid condensate supplied to the steam condenser is thus preheated and then supplied to the organic fluid vaporizer. A second Rankine cycle organic fluid power plant is also included in this embodiment, the organic fluid being vaporized by heat extracted using an interstage cooler associated with the air compressor of the gas turbine. In the second Rankine cycle organic fluid power plant, organic vapor produced by cooling the interstage cooler is supplied to a second organic vapor turbine for producing power. Expanded organic vapor exhausted from the second organic vapor turbine is supplied to a condenser for producing organic fluid condensate which is supplied by a circulation pump to the interstage cooler.

BRIEF DESCRIPTION OF THE DRAWINGS

Embodiments of the present invention are described by way of example with reference to the accompanying drawings wherein:

FIGS. 5A and 5B are modifications of the compressor-turbine arrangement shown in FIG. 5;

DETAILED DESCRIPTION

Figures 1, 1A:
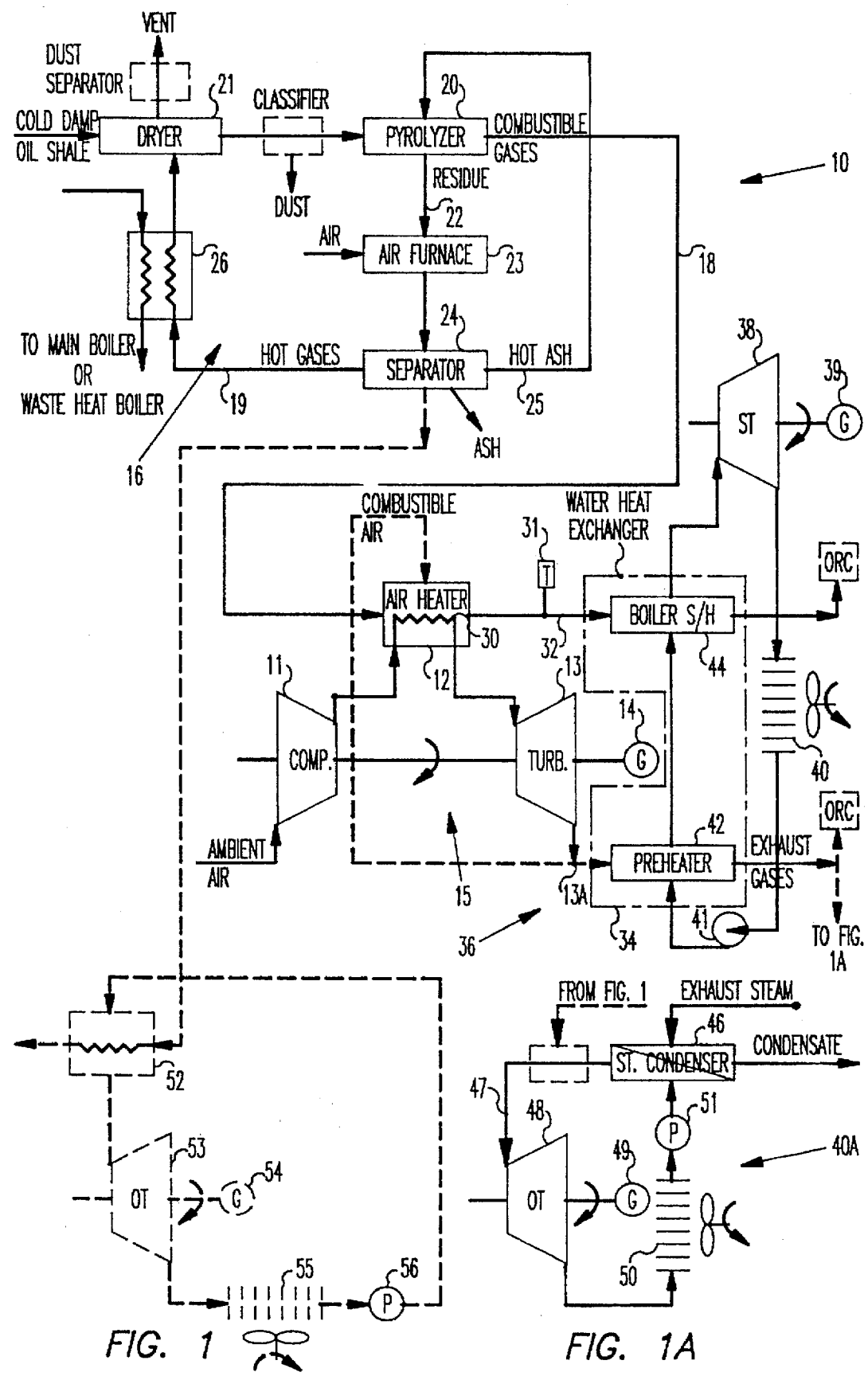
FIG. 1 is a block diagram of the present invention showing the preferred form of the combustible products producing apparatus and one embodiment of a water heat exchanger that is part of a water-based, closed Rankine cycle power plant.
FIG. 1A is a modification of the steam condenser shown in the power plant of FIG. 1.

Referring now to the drawings, reference numeral 10 designates an externally fired combined cycle gas turbine system according to the present invention. System 10 includes combustible products producing apparatus 16 (hereinafter, and in the drawings, referred to as "gas producing apparatus"), external combustion chamber 12, gas turbine system 15, and water-based, closed Rankine cycle power plant 36. Gas turbine system 15 includes compressor 11 for compressing ambient air and producing compressed air, indirect air heat exchanger 30 by which the compressed air is heated to produce heated compressed air, and air turbine 13 directly connected to and driving compressor 11 and generator 14. The heated compressed air expands in turbine 13 thereby driving the generator and producing electricity. Expanded air is exhausted from the turbine through exhaust line 13A. These components of turbine 15 are conventional and no further description is believed necessary.

Gas producing apparatus 16 processes fuel to produce combustible gases in line 18 and hot flue gases in line 19. In the preferred form of the invention, the gas producing apparatus includes pyrolyzer 20 for receiving crushed oil shale from dryer 21 and producing combustible gases in line 18 and carbonaceous residue in line 22. Apparatus 16 also includes air furnace 23 for combusting, in the presence of excess air, the organic material remaining in the carbonaceous residue produced by the pyrolyzer. Air furnace 23 produces at its output a combination of hot particulate or ash and hot flue gases which are applied to separator 24. The separator serves to separate the flue gases from the hot ash, the finer portion of which is delivered by line 25 to pyrolyzer 20 to sustain its operation. The coarser portion of the hot ash is removed. The hot flue gases, together with some fine ash remaining in the flue gases, are supplied to line 19 which applies the hot gases and the remaining particulate ash, to dryer 21 for the purpose of drying the oil shale before the latter is applied to the pyrolyzer.

Alternatively, the hot gases and fine particulate ash, or other matter still present together with the flue gases, first of all can be applied to heat exchanger 26 for extracting heat therefrom and heating, for example, a working fluid. In such case, heated or preheated working fluid then can be supplied to a water boiler such as boiler 44, or other boiler such as a waste heat boiler that uses, for example, an organic fluid like boiler 52 or a suitable boiler for organic turbine 48. In a further alternative arrangement, a portion of the hot flue gases and the remaining fine particulate ash or matter may be supplied directly to dryer 21. The other portion of the hot flue gases and remaining fine particulate ash or matter may be supplied first to heat exchanger 26 and then to dryer 21.

In the embodiment shown in FIG. 1, the combustible gases produced by pyrolyzer 20 are applied to external combustible chamber 12 with which air heat exchanger 30 is operatively associated. The combustible gases burn within the external combustion chamber usually in the presence of excess air, the heat so produced being transferred via air heat exchanger 30 to the air compressed by compressor 11 before the heated air is applied to air turbine 13. Heat depleted combustion products exit chamber 12 though line 32 which carries the combustion products to water heat exchanger 34 of closed Rankine cycle steam power plant 36. Water heat exchanger 34 vaporizes water and produces steam using heat contained in the heat depleted combustion products.

Power plant 36 includes steam turbine 38 for expanding the steam produced by water heat exchanger 34 and driving electric generator 39 connected to the turbine. Heat depleted steam exhausted from turbine 38 is applied to condenser 40, which is shown as being air cooled in FIG. 1, wherein the steam is condensed into condensate which pump 41 returns to the water heat exchanger to complete the water cycle of the power plant.

In the embodiment shown in FIG. 1, water heat exchanger 34 includes preheater 42 which is heated by heat depleted expanded air carried by exhaust line 13A of turbine 13. Water heat exchanger 34 also includes boiler 44 (and optionally a superheater associated therewith), which serves to vaporize (and optionally superheat) the preheated water furnished by the preheater. Boiler 44 is heated by heat depleted combustion products in line 32 produced by external combustion chamber 12.

Instead of using air cooled steam condenser 40, the arrangement illustrated in FIG. 1A can be substituted. Specifically, FIG. 1A shows steam condenser 40A as comprising indirect contact heat exchanger 46 which contains an organic fluid (such as n-pentane or isopentane, depending on operating conditions) that is vaporized as the steam in the condenser cools producing vaporized organic fluid in line 47. This vaporized fluid is applied to organic vapor turbine 48 within which the vaporized fluid expands driving generator 49 which produces electricity. The turbine exhausts expanded organic vapor into condenser 50, shown as being air cooled, wherein condensation takes place producing organic fluid condensate that is returned to condenser 46 by pump 51.

Optionally, some of the combustion air applied to the external combustion chamber 12 can be furnished by gas turbine 13 as shown by the broken lines in FIG. 1. Optionally also, a dust separator can be used as shown by the broken lines in FIG. 1 for extracting small particles from the heated and dried oil shale produced by dryer 21.

Alternatively, or in addition, fine particulate and/or dust can be removed using a suitable filter medium such as classifier apparatus, etc.

In another optional arrangement shown in FIG. 1, some, or all, of the flue gases produced by separator 24 of the gas producing apparatus can be utilized for generating electricity. If all of the flue gases are used, dryer 21 will not be used, and the raw oil will be supplied directly to the pyrolyzer.

Specifically, flue gases produced by separator 24 may be applied to indirect heat exchanger 52 before being vented to the atmosphere. Heat exchanger 52 contains an organic fluid which is vaporized and applied to organic turbine 53 wherein expansion takes place producing expanded organic vapor and driving generator 54 which produces electricity. The expanded vapor exhausted from turbine 53 is condensed in condenser 55, shown as air cooled, producing organic fluid condensate that pump 56 returns to heat exchanger 52.

In a further option in this embodiment, if preferred, heat remaining in heat depleted combustion products produced by external combustion chamber 12 exiting boiler 44 can be utilized, e.g., by producing electricity using, for instance, an organic Rankine Cycle power plant. In addition, heat remaining in expanded air exhausted from turbine 13 exiting preheater 42 can also be utilized, e.g., by producing electricity using, for instance, an organic Rankine cycle power plant. Furthermore, if preferred, alternatively, the heat remaining in expanded air exhausted from turbine 13 exiting preheater 42 can also be utilized, if the arrangement shown in FIG. 1A is used, for vaporizing the organic working fluid in a vaporizer with the vapors being supplied to turbine 48. In this case, steam condenser 46 would operate as a preheater for producing preheated organic fluid condensate supplied to the vaporizer which is also furnished with expanded air that exits preheater 42.

Figure 2:
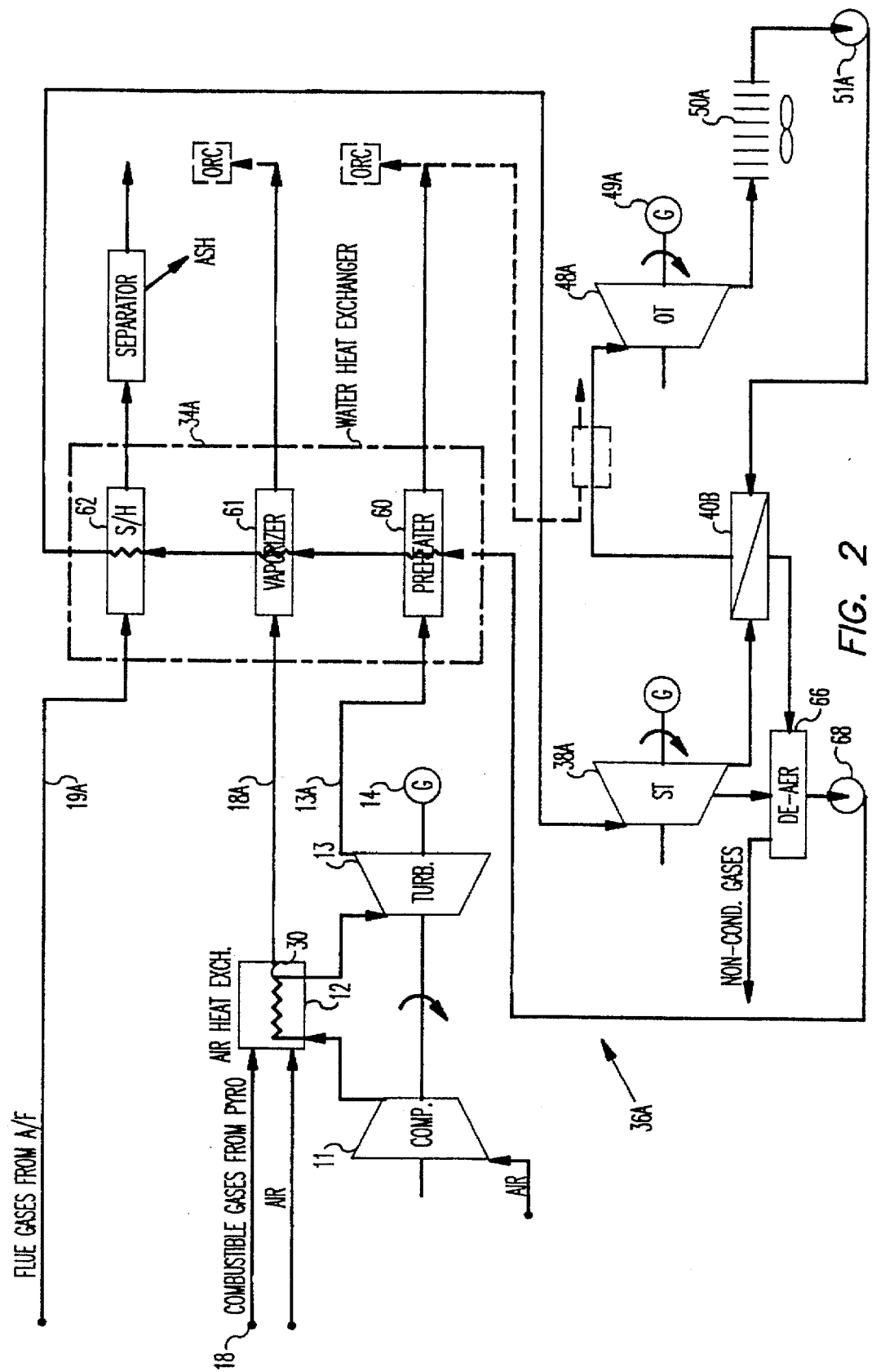
FIG. 2 is a block diagram of another embodiment of water heater according to the present invention.

In embodiment 36A of the invention shown in FIG. 2, water heat exchanger 34A includes preheater 60, vaporizer 61, and superheater 62. Flue gases from air furnace 23 are applied to superheater 62 of the water heat exchanger via line 19A and heat depleted combustion products produced by external combustion chamber 12 are applied via line 18A to vaporizer 61. Expanded air exhausted from turbine 13 is applied to preheater 60 via line 13A.

In operation, water in preheater 60 is preheated by the heat depleted air exhausted from turbine 13 and the preheated water is vaporized in vaporizer 61 by indirect contact with the heat depleted combustion products in line 18A. The steam produced by vaporizer 61 is superheated in superheater 62 utilizing the heat contained in the flue gases produced by separator 24 associated with line 19A. The superheated steam is applied to steam turbine 38A wherein expansion takes place producing expanded steam that is applied to condenser 40B containing an organic fluid. The steam condensate produced by condenser 40B is applied to deaerator 66 which is also supplied with steam bled from an intermediate stage of steam turbine 38A. Non-condensable gases contained in the steam separated in deaerator 66 are extracted. The liquid condensate in the sump of deaerator 66 is returned to preheater 64 by pump 68 completing the water cycle of the power plant.

As shown in FIG. 2, the organic fluid contained in condenser 40B is vaporized as the steam exhausted from turbine 38 condenses; and the vaporized organic fluid is applied to organic vapor turbine 48A connected to generator 49A. Expansion of the organic vapor takes place in the organic turbine causing the generator to produce electricity. Expanded organic vapor is exhausted from the turbine and applied to condenser 50A, shown as being air cooled, wherein the vapor is condensed to a liquid. The condensate so produced is returned by pump 51A to condenser 40B for completing the organic fluid cycle.

In this embodiment, if preferred, heat remaining in heat depleted combustion products produced by external combustion chamber 12 exiting vaporizer 61 can be utilized, e.g., by producing electricity using, for instance, an organic Rankine cycle power plant. In addition, heat remaining in expanded air exhausted from turbine 13 exiting preheater 60 can also be utilized, e.g., by producing electricity using, for instance, an organic Rankine cycle power plant. Furthermore, if preferred, alternatively, the heat remaining in expanded air exhausted form turbine 13 exiting preheater 60 can also be utilized for vaporizing the organic working fluid in a vaporizer with the vapors being supplied to turbine 48A. This optional arrangement is shown in broken lines in FIG. 2. In this case, condenser 40B would operate as a preheater for producing preheated organic fluid condensate that is supplied to the vaporizer.

Figure 3:
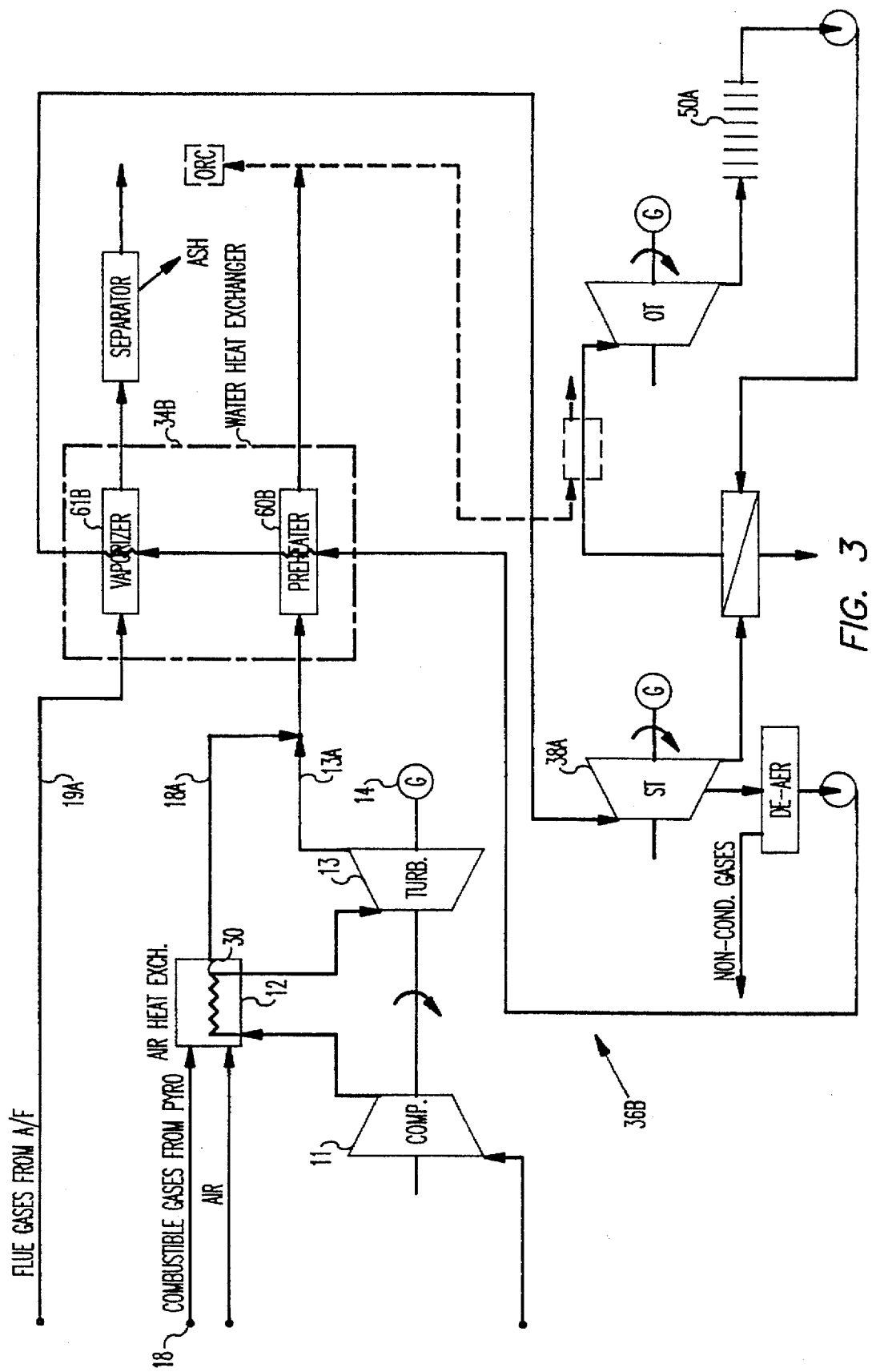
FIG. 3 is a block diagram of a further embodiment of a water heat exchanger according to the present invention.

In embodiment 36B of the invention shown in FIG. 3, water heat exchanger 34B includes preheater 60B and vaporizer 61B. In this embodiment of the invention, heat depleted combustion products in line 18A at the output of external combustion chamber 12 are combined with the expanded air in exhaust line 13A of turbine 13 and applied to preheater 60B for the purpose of preheating water that is supplied to vaporizer 61B. The flue gases from the air furnace of the combustion apparatus in line 19A are applied to vaporizer 60B producing steam which is applied to turbine 38A in the manner described in connection FIG. 2. Cooled flue gases exiting the vaporizer may be treated in a separator for the purpose of removing ash from the gases before they are vented to the atmosphere.

In this embodiment, if preferred, heat remaining in the combined flow of heat depleted combustion products produced by external combustion chamber 12 and expanded air exhausted from turbine 13 exiting preheater 60B can be utilized, e.g., by producing electricity using, for instance, an organic Rankine cycle power plant. Furthermore, if preferred, alternatively, the heat remaining in combined flow exiting preheater 60B can also be utilized for vaporizing the organic working fluid in a vaporizer with the vapors being supplied to turbine 48B. In this case, condenser 40C would operate as a preheater for producing preheated organic fluid condensate for supply to the vaporizer.

Figure 4:
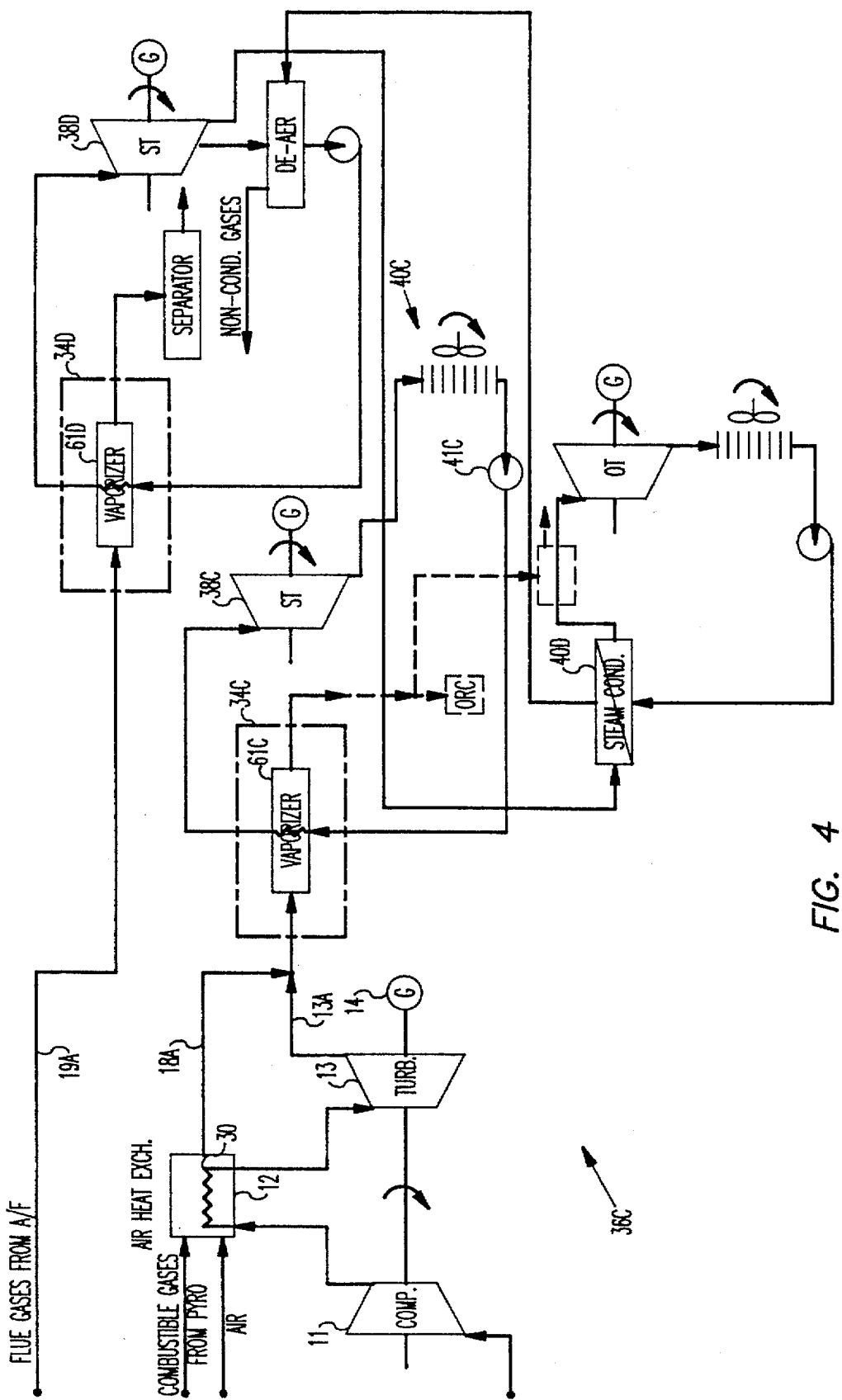
FIG. 4 is a block diagram of a further embodiment of a water heater according to the present invention.

In embodiment 36C of the invention shown in FIG. 4, water heat exchanger 34C includes only vaporizer 61C which is heated in an manner similar to the manner in which preheater 60B in FIG. 3 is heated. That is to say, the heat depleted combustion products in line 18A from the external combustion chamber are combined with expanded air in line 13A connected to the exhaust turbine 13; and the combined stream is applied to vaporizer 61C for the purpose of vaporizing water contained in the vaporizer. Specifically, vaporizer 61C is designed to raise the temperature of the water from the temperature of the steam condenser to the temperature of the steam without using a separate preheater. Steam produced by vaporizer 61C is applied to steam turbine 38C wherein expansion takes place producing expanded steam that is condensed in condenser 40C shown as being air-cooled. The condensate so produced is returned by pump 41C to vaporizer 61C.

In embodiment 36C of the invention, the flue gases in line 19A are applied to a separate, second water heater 34D containing vaporizer 61D. Water in vaporizer 61D is vaporized and applied to steam turbine 38D wherein expansion takes place producing expanded steam that is applied to condenser vaporizer 40D in an manner similar to that described in connection with FIG. 2.

In this embodiment, if preferred, heat remaining in the combined flow of heat depleted combustion products produced by external combustion chamber 12 and expanded air exhausted from turbine 13 exiting vaporizer 61C can be utilized, e.g., by producing electricity using, for instance, an organic Rankine cycle power plant. Furthermore, if preferred, alternatively, the heat remaining in combined flow exiting vaporizer 61C can also be utilized for vaporizing the organic working fluid in a vaporizer with the vapors being supplied to turbine 48C. In this case, condenser 40C would operate as a preheater for producing preheated organic fluid condensate for supply to the vaporizer.

Figure 5:
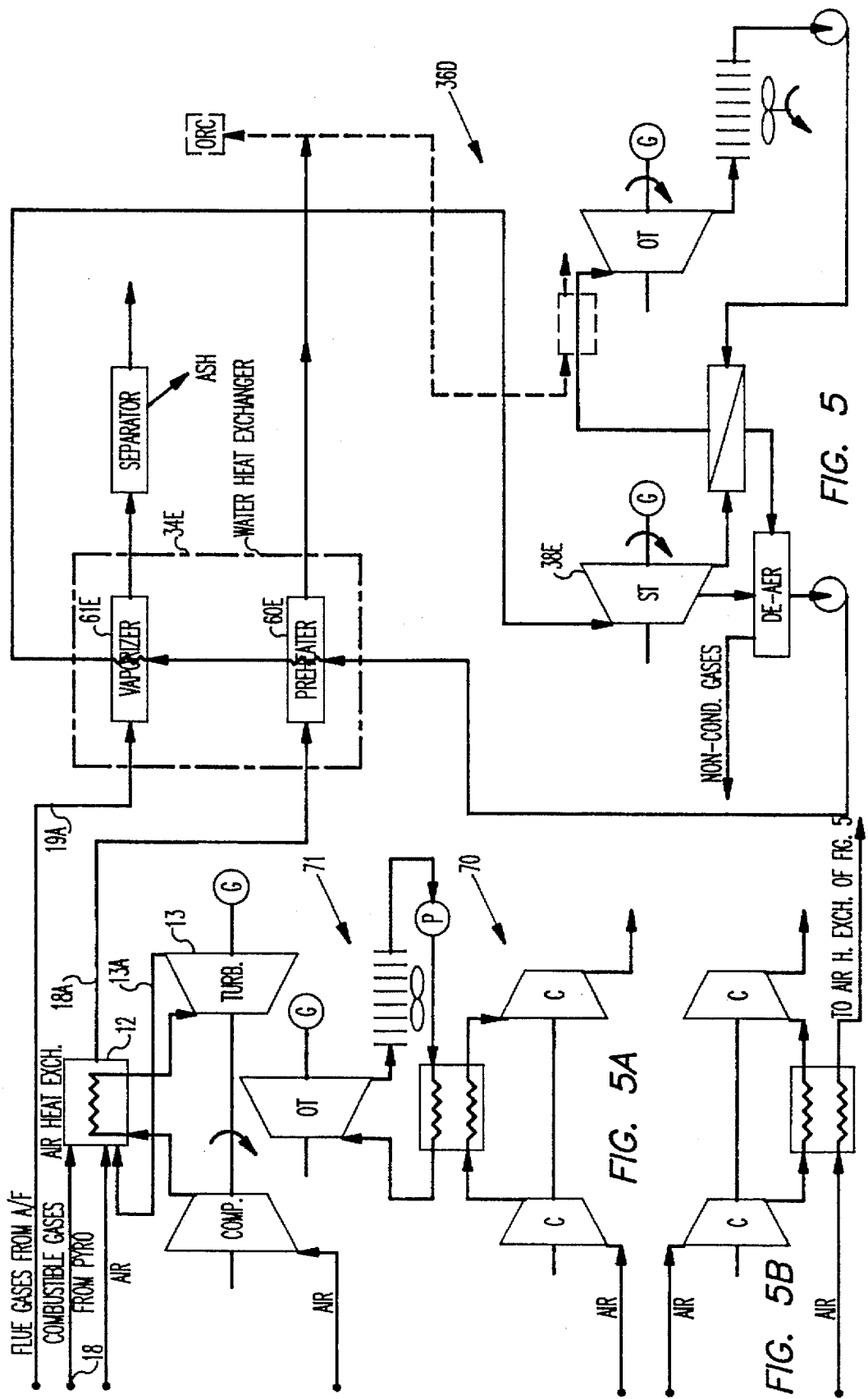
FIG. 5 is a block diagram of a further embodiment of a water heater according to the present invention.

In embodiment 36D of the invention shown in FIG. 5, water heat exchanger 34E includes preheater 60E and vaporizer 61E. In this embodiment, preheater 60E is supplied via line 18A with heat depleted combustion products from external combustion chamber 12 and vaporizer 61E is supplied via line 19A with flue gases from the air furnace for the purpose of vaporizing preheated water furnished by preheater 60E. The steam produced by vaporizer 61E is applied to steam turbine 38E in the same manner as described in connection with FIG. 2.

In the embodiment of the invention shown in FIG. 5, expanded air in line 13A produced by turbine 13 is fed back to external combustion chamber 12 for the purpose of supplying all or part of the air necessary for combustion in the external combustion chamber.

In this embodiment, if preferred, heat remaining in the heat depleted combustion products produced by external combustion chamber 12 exiting preheater 60E can be utilized, e.g., by producing electricity using, for instance, an organic Rankine cycle power plant. Furthermore, if preferred, alternatively, the heat remaining in the flow exiting preheater 60E can also be utilized for vaporizing the organic working fluid in a vaporizer with the vapors being supplied to a downstream turbine. In this case, the condenser associated with steam turbine 38E would operate as a preheater for producing preheated organic fluid condensate for supply to the vaporizer whose heat is derived from preheater 60E.

Modifications of the compressor-turbine arrangement of FIG. 5 is shown in FIGS. 5A and 5B. In FIG. 5A, compressor 70 represents the compressor of FIG. 5, and is separated into a high pressure stage and a low pressure stage. Interstage cooling is effected by an intercooler, the heat being rejected into a vaporizer of organic Rankine cycle power plant 71 having an organic vapor turbine, a condenser shown as being air cooled, and a cycle pump.

In FIG. 5B, interstage cooler 72 extracts heat from air compressed by the high pressure stage of the compressor, and supplies this heat to ambient air which may be supplied to heat exchanger 12 of FIG. 5. This arrangement provides heated, excess air to the heat exchanger.

Figure 6:
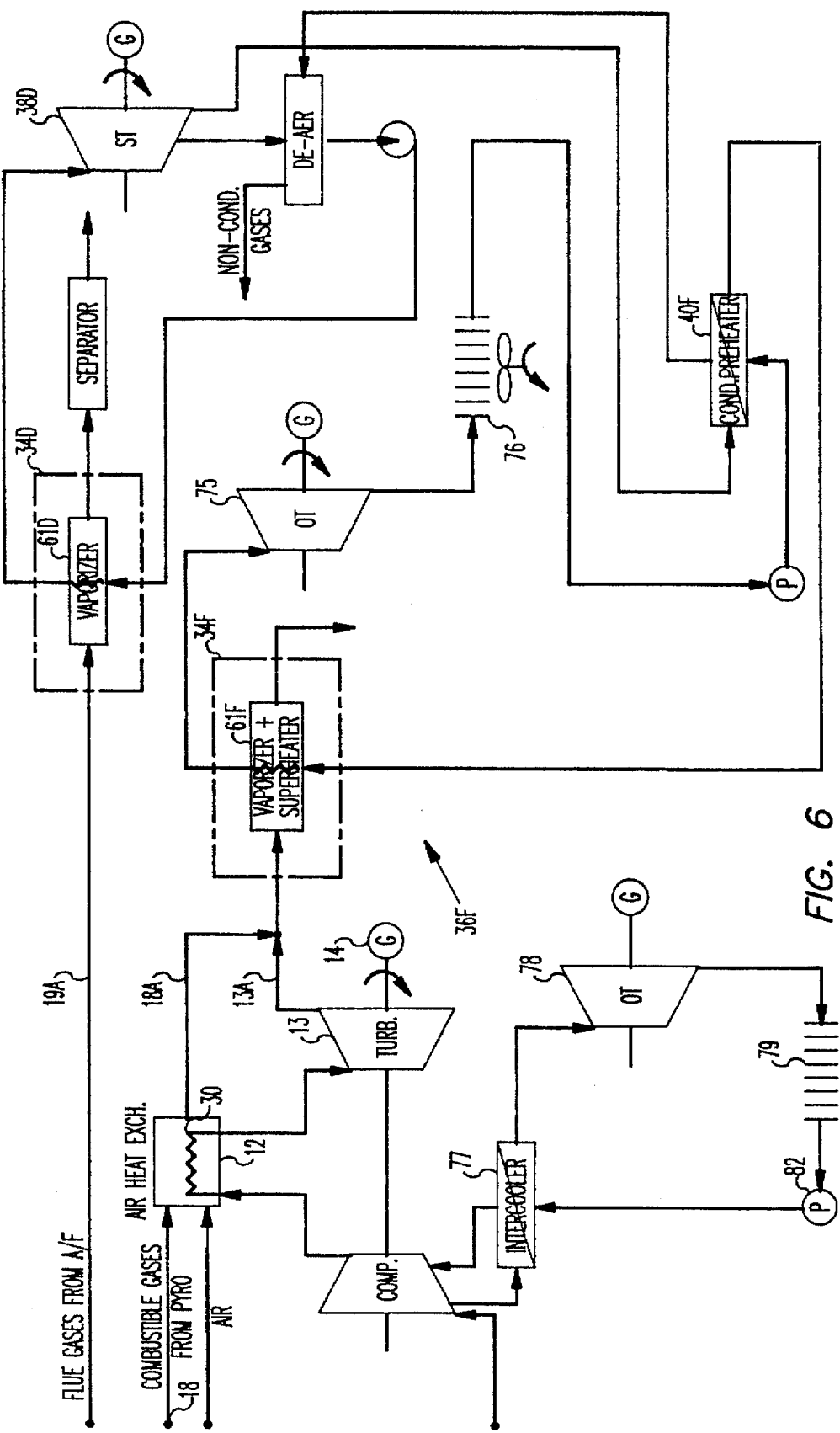
FIG. 6 is a block diagram of a further embodiment of the invention.

FIG. 6 is an embodiment similar to embodiment 36C of FIG. 4, but the organic turbine supplied with heat from steam condenser 40D is eliminated, and interstage cooling for compressor 11 is utilized. Specifically, embodiment 36F shown in FIG. 6 includes vaporizer 61F, which is heated by exhaust gases from turbine 13 and heat depleted combustion products produced by external combustion chamber 12, and serves to vaporize, and preferably superheat, preheated liquid organic fluid. The superheated organic fluid so produced is supplied to organic vapor turbine 75 which drives a generator. Expanded organic vapor exhausted from turbine 75 is condensed in condenser 76, which may be air cooled. The condensate is then pumped into condenser/preheater 40F which condenses steam exhausted from steam turbine 38D, and preheats organic fluid condensate produced by condenser 76. The preheated liquid organic fluid is then pumped into vaporizer/superheater 34F to complete the organic fluid loop. Finally, interstage cooler 77 is associated with compressor 11 is a part of second organic fluid Rankine cycle power plant 80 that is similar to the system shown in FIG. 5A In power plant 80, organic fluid is vaporized by heat extracted from gas turbine compressor 11 in interstage cooler 77. The organic vapor produced by cooling interstage cooler 77 is supplied to second organic vapor turbine 78 for also producing power. Expanded organic vapor that exits turbine 78 is supplied to condenser 79, shown as air cooled, for producing organic fluid condensate. The organic fluid condensate is supplied by circulation pump 82 to gas turbine intercooler 77 to complete this power cycle.

The embodiments described in relation to FIGS. 2 to 6, including FIGS. 5A and 5B, show flue gases being supplied by air furnace 23 to water vaporizer via line 19A. These flue gases may include all the flue gases and remaining fine ash particulate ash or material produced from separator 24. In such a case, dryer 21 will not be used and raw oil shale will be directly supplied to the pyrolyzer. Alternatively, the flue gases in line 19A may include only a portion of the flue gases and remaining fine ash particulate ash or material produced from separator 24. In such case, the remaining portion of the flue gases is supplied to dryer 21 as described in relation to FIG. 1.

Furthermore, while pyrolyzing of oil shale and the use of the gaseous products and other products produced by the pyrolyzing of oil shale is specifically mentioned above as the source of energy for operating the gas turbine and the combined cycle power plant, other fuels and sources of heat or energy can also be used in the present invention. For example, solar energy, combustion of coal directly or the products of gasification of coal, fuel oil, heavy fuel oil, land-fill gas, biomass, etc. can be used as the energy or heat source for operating the gas turbine and combined cycle power plant.

Furthermore, the combustion of oil shale, or other substances, together with other materials (e.g., other materials rich in sulfur) such as fuel rich in sulfur (e.g., petroleum coke), or other fuels as described, for example, in copending U.S. patent applications Ser. Nos. 07/683,690, 07/835,358, 07/834,790, 07/834,871, 08/034,887, and 08/078,502 (the disclosures of which, and the disclosures of their continuations of which, are hereby incorporated by reference) can also be used as the energy or heat source for the gas turbine and combined cycle power plant. Moreover, the combustion of oil shale, or oil shale together with other materials (e.g.,other materials rich in sulfur, such as fuels), or other fuels, can be carried out by means other than pyrolyzing (for example, by using gases produced by the gasification of oil shale). In a further example, the oil shale or oil shale together with materials such as fuel can be combusted in a fluidized bed, examples of embodiments of which are shown in FIGS. 7 and 8.

Figure 7:
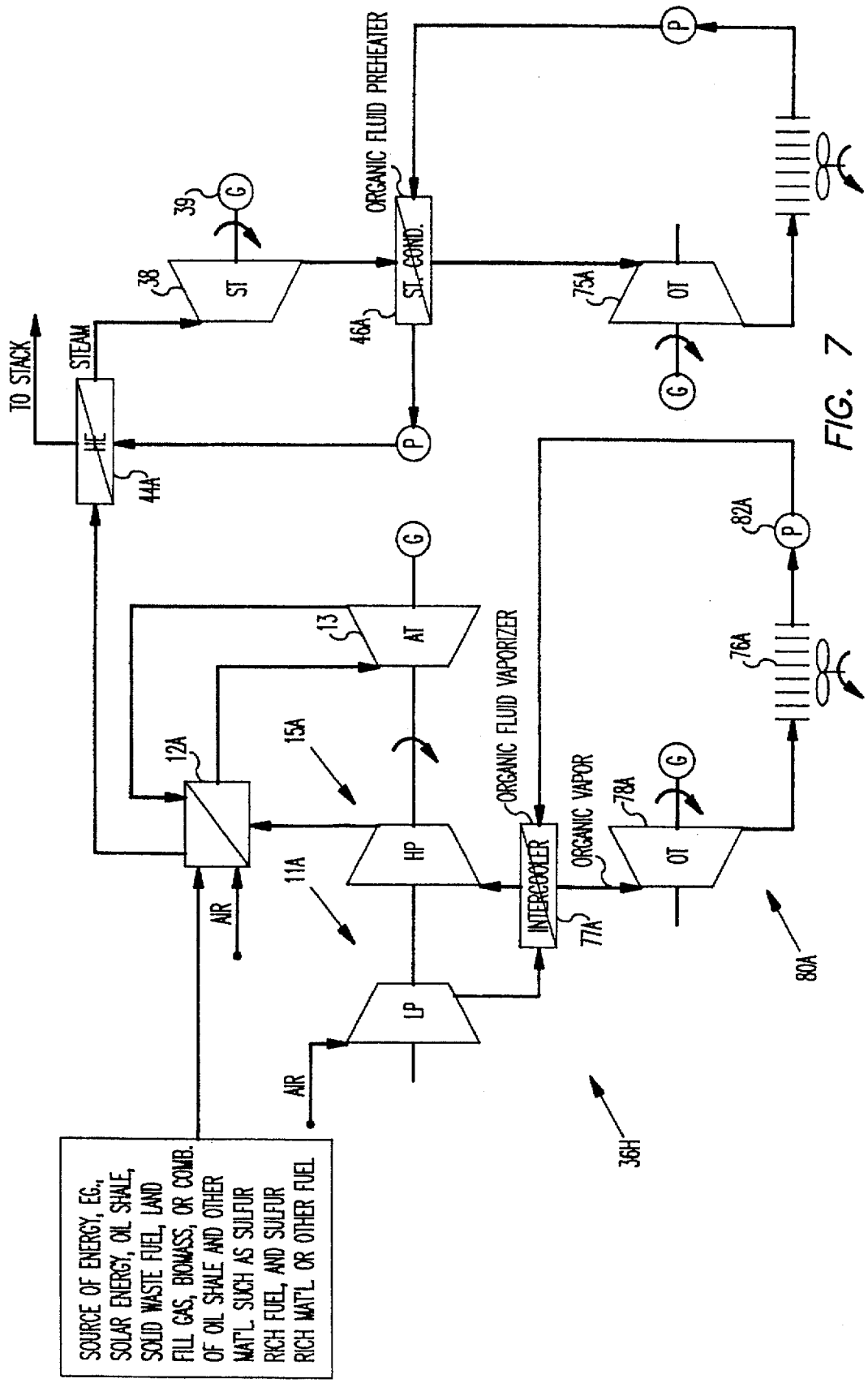
FIG. 7 is a block diagram of a further embodiment of the invention.
Figure 8:
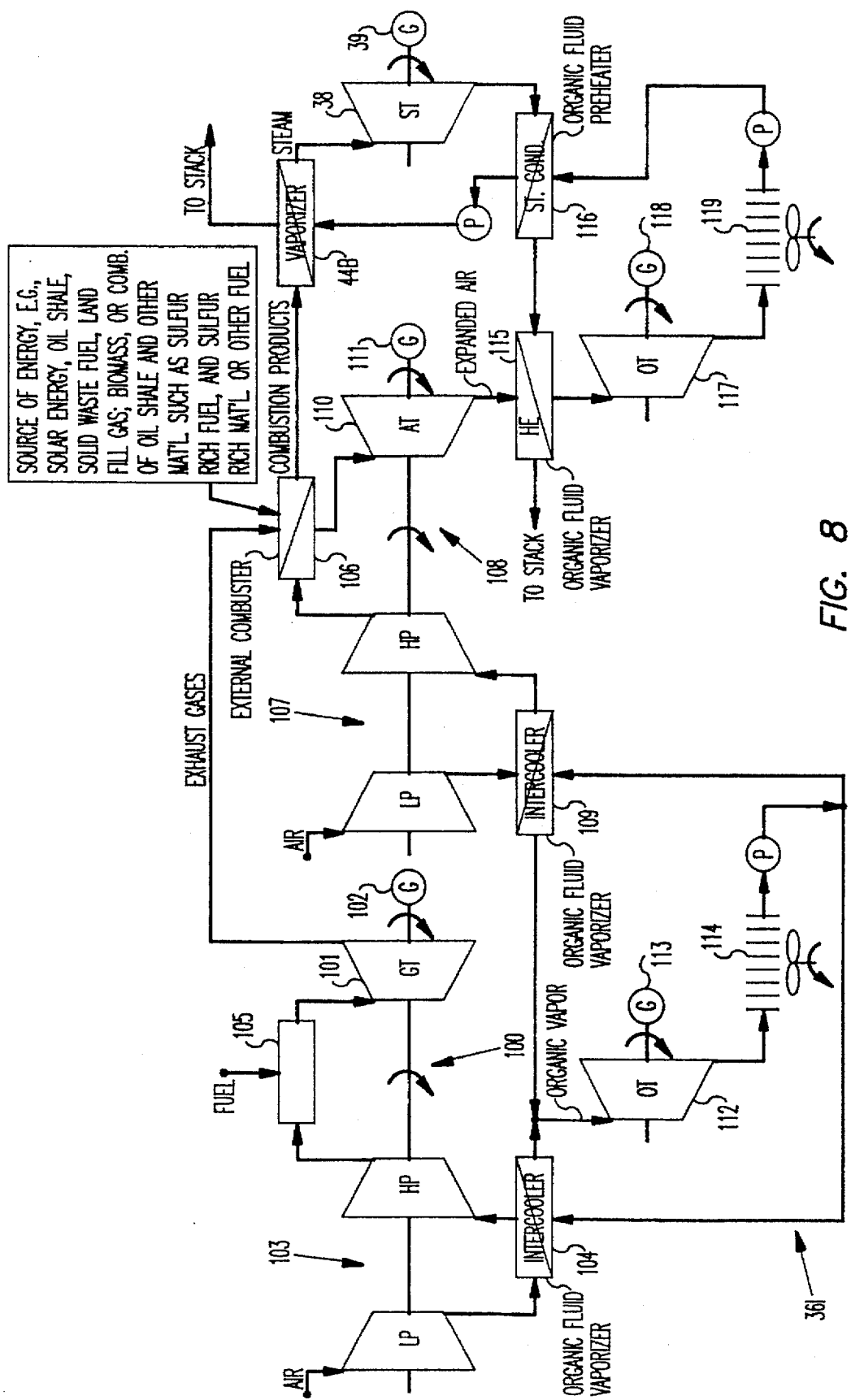
FIG. 8 is a block diagram of a further embodiment of the invention.

Embodiment 36H shown in FIG. 7 utilizes external combustion chamber 12A in which solid waste, for example, or other energy sources as shown in the drawing, is burned in the presence of air, or used, to indirectly heat compressed air produced by turbogenerator unit 15A. If preferred, a fluidized bed combustor can be utilized, or combustible products produced by the pyrolysis of oil shale, or oil shale together with other material, e.g., other material rich in sulfur such as sulfur rich fuels, or other fuels as described, for example, in the previously mentioned patent applications, can be used. The products of combustion produced by chamber 12A are applied to heat exchanger 44A where indirect contact with water occurs producing steam that is applied to steam turbine 38 driving generator 39. The resultant cooled combustion gases are then vented through a stack (not shown). If suitable, such combustion gases may be used to operate a waste heat converter, e.g., an organic Rankine cycle power plant.

Steam exhausted from turbine 38 is condensed in steam condenser 46A where liquid organic fluid is indirectly contacted and vaporized thereby. After the vaporized organic fluid is applied to organic vapor turbine 75A which drives a generator for generating electricity, the expanded organic vapor exiting turbine 75A is condensed, preferably in an air cooled condenser, and liquid organic fluid is pumped back into steam condenser 46A to complete the organic fluid cycle.

Second Rankine cycle organic fluid power plant 80A is also a part of this embodiment. In power plant 80A, organic fluid is vaporized by heat extracted from gas turbine compressor 11 in interstage cooler 77A. The organic vapor produced by cooling interstage cooler 77A is supplied to second organic vapor turbine 78A for also producing power. Expanded organic vapor that exits turbine 78A is supplied to condenser 76A, shown as air cooled, for producing organic fluid condensate. The organic fluid condensate is supplied by circulation pump 82A to gas turbine intercooler 77A to complete this power cycle.

In embodiment 36I shown in FIG. 8, turbogenerator 100 is a conventional gas turbine based arrangement in which turbine 101 drives generator 102 and compressor 103 having low pressure stage LP and high pressure stage HP. Interstage cooler 104 extracts heat from the air produced by the LP stage and vaporizes an organic fluid. The cooled air that exits from the interstage cooler is further compressed by the HP stage of the compressor and is supplied to combustor 105 where fuel is burned to produce hot combustion gases that are applied to gas turbine 101. Hot gases exhausted from this turbine are directed to external combustion chamber 106 wherein solid waste fuel, for example, is combusted producing hot products of combustion. Alternatively, other energy sources can be used including, but not limited to, solar energy, biomass, oil shale, oil shale together with materials such as other sulfur rich materials, or combustible products produced by the pyrolysis of oil shale, or oil shale together with other material, e.g., other material rich in sulfur such as sulfur rich fuels, or other fuels as described, for example, in the previously mentioned patent applications, can be used. If preferred, a fluidized bed combustor can be used. Furthermore, other energy sources, such as those listed in FIGS. 7 and 8, also can be used.

Heat in the hot products of combustion is indirectly transferred to compressed air produced by compressor 107 of turbogenerator 108 which is an air turbine based arrangement. Compressor 107 includes low pressure stage LP that produces compressed air that is cooled in interstage cooler 109 that serves to vaporize organic fluid.

The cooled air that exits interstage cooler 109 is further compressed by the HP stage of the compressor and is supplied to external combustion chamber 106 wherein the high pressure air produced by the HP stage of compressor 107 is indirectly heated and supplied to air turbine 110 that drives electric generator 111. The products of combustion produced by chamber 106 are applied to heat exchanger 44B where indirect contact with water occurs producing steam that is applied to steam turbine 38 driving electric generator 39. The resultant cooled combustion gases are then vented through a stack (not shown). If suitable, the combustion gases can be used to operate a waste heat converter, e.g., an organic Rankine cycle power plant. Finally, steam condensate produced in heat exchanger 116 by condensing expanded steam exiting steam turbine 38, is pumped back into vaporizer 44B completing the water cycle.

Vaporized organic fluid produced by intercoolers 104 and 109 is supplied to first organic vapor turbine 112 that drives electric generator 113. Expanded organic vapor that is exhausted from turbine 112 is condensed in condenser 114, preferably air cooled. The resultant condensate is pumped back to both intercoolers 104 and 109 to complete the first organic fluid cycle.

Air exhausted from air turbine 110 is supplied to heat exchanger 115 which vaporizes liquid organic fluid that had been preheated in steam condenser 116 within which steam exhausted from steam turbine 38 is condensed. Vaporized organic fluid produced by heat exchanger 115 is applied to second organic vapor turbine 117 that drives generator 118. Expanded organic vapor exhausted from turbine 117 is condensed, preferably in air cooled condenser 118, and pumped back to heat exchanger 116 completing the second organic fluid cycle.

Furthermore, since in the present invention, the gas turbine used is operated by heated air which is supplied to the inlet of the gas turbine without the direct contact of fuel and combustion products, the use of aeroderivative gas turbines is possible and is preferred.

The embodiments described in relation to FIGS. 5A, 6, 7 and 8 employ separate organic fluid power cycles for utilizing heat extracted from the intercoolers of the compressors associated with the gas turbines. If preferred, however, an alternative single dual pressure organic power cycle like that shown in FIG. 9 can be used. In this case, a single organic condenser 114A, shown as being air cooled, is used. As shown, single electric generator 137 driven by steam turbine 138, and by low pressure organic fluid turbine 112A and high pressure organic fluid turbine 117A, can be used for producing electricity. Alternatively, separate electric generators may be used.

Figures 9, 9A:
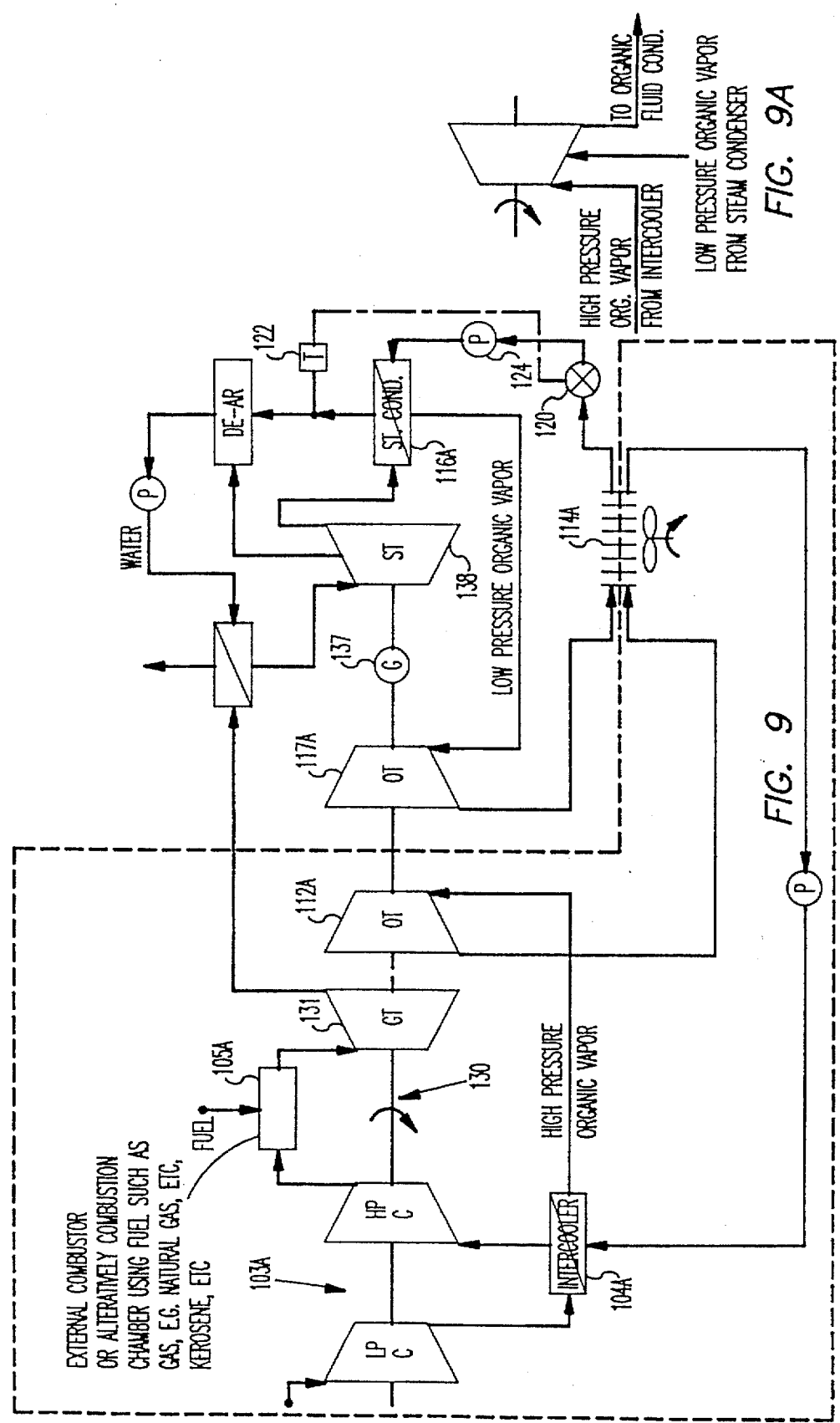
FIG. 9 is a block diagram showing a power plant into which a further embodiment of the invention has been incorporated.
FIG. 9A is an embodiment of an organic vapor turbine to be incorporated in the power plant shown in FIG. 9.

If preferred, instead of using separate low pressure organic fluid turbine 117A and high pressure organic fluid turbine 112A, low pressure organic fluid can be injected at an intermediate stage of an organic vapor turbine to which high pressure organic fluid is supplied from intercooler 104A as shown in FIG. 9A. Valve 120 is controlled by temperature sensor 122 provided for sensing the temperature of the fluid exiting the steam condensate side of the steam condenser. Thus, valve 120 operates to ensure that sufficient organic fluid condensate is supplied to steam condenser 116A by feed pump 124 so that the temperature of the fluid exiting the steam condensate side of steam condenser 116A is such that steam condensate is always produced.

Alternatively, if preferred, instead of using steam turbine 128 in conjunction with low pressure organic vapor turbine 117A, a single organic Rankine cycle turbine can be used operating on the exhaust gases of gas turbine 131 and having an air or water cooled condenser. In a still further alternative, in the embodiment described in relation to FIG. 9, two separate organic vapor condensers can be used instead of single condenser 114 thus permitting two separate organic Rankine power cycles to be used.

Furthermore, even though in the previously described embodiments of the present invention, an external combustion chamber is used, the system of the present embodiment is also very advantageous when a gas turbine and steam turbine are used together in a combined cycle power plant where the gas turbine is not externally fired, but rather run by gas, such as natural gas, etc., or other suitable fuel, e.g., kerosene, etc. for combusting in combustion chamber 105A of the gas turbine to directly heat the compressed air exiting compressor 103A of gas turbine 130 also as shown in FIG. 9.

Additionally, the use of an organic Rankine cycle power plant utilizing heat extracted from the intercooler of a gas turbine similar in principle to that shown in FIG. 9 is also very advantageous even when the gas turbine is used solely for supplying power during peak electric demand and is not part of a combined cycle power plant. Thus, according to a further embodiment of the present invention (shown by the components enclosed by the dashed lines in FIG. 9), an organic Rankine cycle power plant utilizing heat extracted from the intercooler of a gas turbine can be used for producing power in a manner similar to that shown in the gas turbine portion of FIG. 9. In this embodiment as well, the combustion chamber of the gas turbine can be an external combustion chamber, or run by gas, such as natural gas, etc., or other suitable fuel, e.g., kerosene, etc. for directly heating the compressed gas exiting the compressor of the gas turbine.

Furthermore, when oil shale or other solid fuel or material is used in the present invention, its feeding rate can be controlled according to the present invention by a parameter of the power plant, such as the exit temperature of the external combustion chamber. Such temperature may be measured by a temperature sensor, such as sensor 31 shown, for example, at the exit of external combustion chamber 12 in FIG. 1, etc.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. An externally fired gas turbine system of the type having a compressor for compressing ambient air and producing compressed air, an air heat exchanger for heating the compressed air to produce heated compressed air, and a turbine coupled to said compressor and to a generator for expanding said heated compressed air to drive the generator and compressor, and to produce expanded air, said system comprising:

a) an external combustion chamber operatively associated with said heat exchanger;
   b) means for supplying fuel and air to said external combustion chamber for indirectly heating said compressed air to produce said heated compressed air, and to produce heat depleted combustion products;
   c) a closed Rankine cycle power plant having a water heat exchanger for vaporizing water and producing steam, means for applying said heat depleted combustion products to said water heat exchanger, a steam turbine for expanding the steam and producing power and expanded steam, a steam condenser for condensing the expanded steam and producing condensate, and means for returning said condensate to said water heat exchanger; and
   d) means for feeding back said expanded air to said external combustion chamber.

2. A system according to claim 1 wherein said water heat exchanger includes a preheater heated by said expanded air for heating said condensate and producing preheated water, and a vaporizer heated by said heat depleted combustion products for vaporizing said preheated water thereby producing steam.

3. A system according to claim 2 wherein said steam condenser is air cooled.

4. A system according to claim 2 wherein said steam condenser is cooled with liquid organic fluid that is vaporized when the steam in the condenser condenses producing vaporized organic fluid and steam condensate, and including an organic vapor turbine within which said vaporized organic fluid expands producing power and expanded organic vapor, and an organic fluid condenser for condensing said expanded organic vapor and producing organic fluid condensate, and means for returning said organic fluid condensate to said steam condenser.

5. A system according to claim 1 wherein said steam condenser includes an organic fluid that is vaporized by the condensation of said expanded steam producing vaporized organic fluid, means for applying said vaporized organic fluid to an organic fluid turbine for generating power and producing expanded vaporized organic fluid, an organic fluid condenser for condensing said expanded organic fluid, and means for returning organic fluid condensed in said organic fluid condenser to said steam condenser.

6. A system according to claim 1 including means for de-aerating condensate produced by said steam condenser.

7. A system according to claim 1 wherein said compressor comprises multiple stages, and an intercooler for cooling the air between the stages.

8. A system according to claim 7 wherein said intercooler contains an organic fluid that is vaporized by the cooling of the air compressed by the previous stage producing vaporized organic fluid, means for applying said vaporized organic fluid to an organic fluid turbine for generating power and producing expanded vaporized organic fluid, an organic fluid condenser for condensing said expanded organic fluid, and means for returning organic fluid condensed in said organic fluid condenser to said intercooler.

9. A system according to claim 1 wherein said compressor is multi-staged, and interstage cooling means is provided between stages of said compressor for extracting heat from the compressed air, said inter-stage cooling means including an organic fluid vaporizer containing an organic fluid that is vaporized by the cooling of the compressed air, an organic vapor turbine coupled to a generator for receiving and expanding vapor produced by said vaporizer thereby driving said generator and producing expanded organic vapor, an organic vapor condenser for condensing said expanded organic vapor, and means for returning condensed organic vapor to said organic fluid vaporizer.

10. An externally fired gas turbine system of the type having a compressor for compressing ambient air and producing compressed air, an air heat exchanger for heating the compressed air to produce heated compressed air, a turbine for expanding the heated and compressed air to produce expanded air, and a generator connected to the turbine for generating electricity, said system comprising:

a) combustible products producing apparatus for processing fuel to produced combustible products that include combustible gases;

b) an external combustion chamber operatively associated with said air heat exchanger for burning said combustible products and transferring heat to said compressed air in the air heat exchanger and producing heat depleted combustion products;

c) a closed Rankine cycle power plant having a water heat exchanger for vaporizing water and producing steam, means for applying said heat depleted combustion products to said water heat exchanger, a steam turbine for expanding the steam and producing power and expanded steam, a steam condenser for condensing the expanded steam and producing condensate, and means for returning said condensate to said water heat exchanger.

11. A system according to claim 10 wherein said combustible products producing apparatus includes a pyrolyzer for processing oil shale and producing combustible products that include combustible gases, and a carbonaceous residue, an air furnace for combusting organic matter remaining in the carbonaceous residue and producing hot flue gases and hot ash, a separator for separating said hot flue gases and hot ash into a stream of coarse ash and a stream of flue gases and remaining fine ash, and means for supplying said stream of coarse ash to the pyrolyzer for sustaining its operation.

12. A system according to claim 11 wherein said combustible products producing apparatus includes a dryer for drying said oil shale, and means for directing said stream of hot flue gases and remaining fine ash to said dryer for drying said oil shale before it is processed in said pyrolyzer.

13. A system according to claim 11 wherein said water heat exchanger includes a preheater heated by said expanded air for heating said condensate and producing preheated water, and a vaporizer heated by said heat depleted combustion products for vaporizing said preheated water thereby producing steam.

14. A system according to claim 13 wherein said water heater includes a superheater heated by flue gases in said stream of flue gases and remaining fine ash for superheating steam produced by said vaporizer.

15. A system according to claim 13 wherein said steam condenser is cooled with liquid organic fluid that is vaporized when the steam in the condenser condenses producing vaporized organic fluid and steam condensate, and including an organic vapor turbine within which said vaporized organic fluid expands producing power and expanded organic vapor, and an organic fluid condenser for condensing said expanded organic vapor and producing organic fluid condensate, and means for returning said organic fluid condensate to said steam condenser.

16. A system according to claim 11 wherein said water heat exchanger includes a preheater heated by both said heat depleted combustion products and said expanded air for heating said condensate and producing preheated water, and a vaporizer heated by flue gases for vaporizing said preheated water thereby producing steam.

17. A system according to claim 16 wherein said steam condenser is cooled with liquid organic fluid that is vaporized when the steam in the condenser condenses producing vaporized organic fluid and steam condensate, and including an organic vapor turbine within which said vaporized organic fluid expands producing power and expanded organic vapor, and an organic fluid condenser for condensing said expanded organic vapor and producing organic fluid condensate, and means for returning said organic fluid condensate to said steam condenser.

18. A system according to claim 17 wherein said organic fluid condenser is air-cooled.

19. A system according to claim 11 wherein said water heat exchanger includes a vaporizer heated by both said heat depleted combustion products and said expanded air for vaporizing said condensate thereby producing steam.

20. A system according to claim 19 including a second closed Rankine cycle power plant having a second water heat exchanger for vaporizing water and producing steam using heat contained in said flue gases, a second steam turbine for expanding the steam and producing power and expanded steam, and a second steam condenser for condensing the expanded steam and producing condensate, and means for returning said condensate to said second water heat exchanger.

21. A system according to claim 20 wherein said second steam condenser is cooled with liquid organic fluid that is vaporized when the steam in the condenser condenses producing vaporized organic fluid and steam condensate, and including an organic vapor turbine within which said vaporized organic fluid expands producing power and expanded organic vapor, and an organic fluid condenser for condensing said expanded organic vapor and producing organic fluid condensate, and means for returning said organic fluid condensate to said steam condenser.

22. A system according to claim 11 wherein said water heat exchanger includes a preheater heated by said heat depleted combustion products for heating said condensate and producing preheated water, and a vaporizer heated by said flue gases for vaporizing said preheated water thereby producing steam.

23. A system according to claim 22 wherein said expanded air is fed back to said air heat exchanger.

24. An externally fired gas turbine system of the type having a compressor for compressing ambient air and producing compressed air, an air heat exchanger for heating the compressed air to produce heated compressed air, a turbine for expanding the heated and compressed air to produce expanded air, and a generator connected to the turbine for generating electricity, said system comprising:

a) combustible products producing apparatus for processing fuel to produced combustible products that include combustible gases;

b) an external combustion chamber operatively associated with said air heat exchanger for burning said combustible products and transferring heat to said compressed air in the air heat exchanger and producing heat depleted combustion products;

c) a closed Rankine cycle power plant having a water heat exchanger for vaporizing water and producing steam, means for applying said heat depleted combustion products to said water heat exchanger, a steam turbine for expanding the steam and producing power and expanded steam, a steam condenser for condensing the expanded steam and producing condensate, and means for returning said condensate to said water heat exchanger;

d) wherein said combustible products producing apparatus includes a pyrolyzer for processing oil shale and producing combustible products that include combustible gases and a carbonaceous residue, an air furnace for combusting organic matter remaining in the carbonaceous residue and producing hot flue gases and hot ash, and means for supplying coarse hot ash separated from the hot ash to the pyrolyzer for sustaining its operation; and e) wherein said water heat exchanger includes a preheater heated by said heat depleted combustion products for preheating the water condensate, and a vaporizer for vaporizing water preheated by said vaporizer.

25. A system according to claim 24 wherein said vaporizer is heated by said hot flue gases from said air furnace.

26. A system according to claim 25 wherein said expanded air is fed back to said external combustion chamber.

27. An externally fired gas turbine system of the type having a compressor for compressing ambient air and producing compressed air, an air heat exchanger for heating the compressed air to produce heated compressed air, and a turbine coupled to said compressor and to a generator for expanding said heated compressed air to drive the generator and compressor, and to produce expanded air, said system comprising:

a) a pyrolyzer for processing fuel and producing combustible products that include combustible gases, and a carbonaceous residue, an air furnace for combusting said carbonaceous residue and producing hot flue gases containing available heat and hot ash, and means for separating hot ash from said flue gases and supplying the hot ash to the pyrolyzer for sustaining its operation;

b) an external combustion chamber operatively associated with said air heat exchanger for burning said combustible gases and indirectly heating said compressed air to produce said heated compressed air, and to produce heat depleted combustion products containing available heat; and c) a closed Rankine cycle power plant having a water heat exchanger for vaporizing water and producing steam, means for applying said available heat to said water heat exchanger, a steam turbine for expanding the steam and producing power and expanded steam, a steam condenser for condensing the expanded steam and producing steam condensate, and means for returning said condensate to said water heat exchanger.

28. An externally fired gas turbine system according to claim 27 wherein said water heat exchanger includes a preheater for preheating said steam condensate and a vaporizer for vaporizing condensate preheated by said preheater.

29. An externally fired gas turbine system according to claim 28 wherein said preheater is heated by said heat depleted combustion products.

30. An externally fired gas turbine system according to claim 29 wherein said vaporizer is heated by said flue gases.

31. An externally fired gas turbine system of the type having a compressor for compressing ambient air and producing compressed air, an air heat exchanger for heating the compressed air to produce heated compressed air, a turbine for expanding the heated and compressed air to produce expanded air, and a generator connected to the turbine for generating electricity, said system comprising:

a) combustible products producing apparatus for processing fuel to produce combustible products that include combustible gases;

b) an external combustion chamber operatively associated with said air heat exchanger for burning said combustible products and transferring heat to said compressed air in the air heat exchanger and producing heat depleted combustion products;

c) a closed Rankine cycle power plant having a water heat exchanger for vaporizing water and producing steam, means for applying said heat depleted combustion products to said water heat exchanger, a steam turbine for expanding the steam and producing power and expanded steam, a steam condenser for condensing the expanded steam and producing condensate, and means for returning said condensate to said water heat exchanger; and d) wherein said water heat exchanger includes a preheater heated by said heat depleted combustion products for preheating the water condensate and producing cooled heat depleted combustion products, and a vaporizer for vaporizing water preheated by said vaporizer.

32. A system according to claim 31 wherein said steam condenser is cooled with liquid organic fluid that is vaporized when the steam in the condenser condenses producing vaporized organic fluid and steam condensate, and including an organic vapor turbine within which said vaporized organic fluid expands producing power and expanded organic vapor, and an organic fluid condenser for condensing said expanded organic vapor and producing organic fluid condensate, and means for returning said organic fluid condensate to said steam condenser.

33. A system according to claim 32 wherein said organic fluid condenser is air-cooled.

34. A system according to claim 32 including a heat exchanger for transferring heat contained in said cooled heat depleted combustion products to said vaporized organic fluid before the latter is applied to said organic turbine.

35. A system according to claim 31 wherein said expanded air is fed back to said external combustion chamber.

* * * * *

UNITED STATES PATENT AND TRADEMARK OFFICE
CERTIFICATE OF CORRECTION

PATENT NO. : 5,687,570
DATED : November 18, 1997
INVENTOR(S) : Bronicki et al.

It is certified that error appears in the above-identified patent and that said Letters Patent is hereby corrected as shown below:

Column 15, claim 24,
Line 2, after the word "said", delete the word "vaporizer" and insert the word -- preheater --.

Column 16, claim 31,
Line 28, after the word "said", delete the word "vaporizer" and insert the word -- preheater --.

Signed and Sealed this

Fourth Day of December, 2001

Attest:

NICHOLAS P. GODICI
*Attesting Officer*    *Acting Director of the United States Patent and Trademark Office*